(12) United States Patent
Pett et al.

(10) Patent No.: US 7,730,846 B2
(45) Date of Patent: Jun. 8, 2010

(54) STRAIN-RESPONSIVE VISUAL INDICATOR

(75) Inventors: Martin Andrew Pett, Hampshire (GB); Ian Andrew Jamieson, Fife (GB)

(73) Assignee: Qinetiq Limited (GB)

( * ) Notice: Subject to any disclaimer, the term of this patent is extended or adjusted under 35 U.S.C. 154(b) by 114 days.

(21) Appl. No.: 12/088,990

(22) PCT Filed: Oct. 2, 2006

(86) PCT No.: PCT/GB2006/003670

§ 371 (c)(1),
(2), (4) Date: Apr. 2, 2008

(87) PCT Pub. No.: WO2007/039725

PCT Pub. Date: Apr. 12, 2007

(65) Prior Publication Data

US 2008/0264327 A1 Oct. 30, 2008

(30) Foreign Application Priority Data

Oct. 5, 2005 (GB) ................. 0520243.7
Nov. 11, 2005 (GB) ................. 0523015.6

(51) Int. Cl.

| G01B 11/16 | (2006.01) |
|---|---|
| G01B 5/30 | (2006.01) |
| B26B 21/40 | (2006.01) |
| A46B 15/00 | (2006.01) |

(52) U.S. Cl. .............. 116/212; 116/DIG. 34; 15/167.1; 30/41.7; 73/762

(58) Field of Classification Search ........... 116/212, 116/DIG. 34; 73/762; 15/167.1; 30/41.7, 30/41.8

See application file for complete search history.

(56) References Cited

U.S. PATENT DOCUMENTS

| 3,572,091 A * | 3/1971 | McFarland ............ 73/760 |
| 3,613,679 A * | 10/1971 | Bijou ................... 602/75 |
| 4,213,463 A * | 7/1980 | Osenkarski ........... 600/392 |
| 4,958,853 A * | 9/1990 | Doty .................. 280/801.1 |
| 5,146,645 A | 9/1992 | Dirksing |

(Continued)

FOREIGN PATENT DOCUMENTS

EP 0 291148 11/1988

(Continued)

*Primary Examiner*—R. A. Smith
(74) *Attorney, Agent, or Firm*—McDonnell Boehnen Hulbert & Berghoff LLP

(57) ABSTRACT

A strain-responsive visual indicator comprises a pair of overlapping shutter strips (1, 2) adapted to be mounted to a substrate such that strain in the substrate causes relative movement M between them. Each shutter strip comprises an alternating set of windows (5) or (6) and bars (7) or (8) and the distal strip (2) is backed by a strip (3) of a different color exposed through its windows (6), or the distal strip can instead be printed with a set of alternating colors in place of its windows and bars. The effect is that under different strain conditions different color indications from the distal strip (2) will be visible through the windows (5) of the proximal strip (1), in accordance with the relative positions of the two strips. The indicator can be incorporated e.g. in the shaft of a toothbrush to give a visual warning in response to flexure of the shaft if excessive brushing pressure is applied. Numerous other applications and the use of different types of indicia are indicated in the specification.

19 Claims, 15 Drawing Sheets

U.S. PATENT DOCUMENTS

| | | | |
|---|---|---|---|
| 5,161,891 A * | 11/1992 | Austill | 374/141 |
| 5,322,437 A | 6/1994 | Hunter | |
| 6,389,636 B1 * | 5/2002 | Savill | 15/167.1 |
| 6,425,295 B1 | 7/2002 | Meginniss | |
| 6,510,617 B1 * | 1/2003 | Gerdes et al. | 33/484 |
| 7,422,256 B2 * | 9/2008 | Mueller | 294/74 |
| 2003/0144596 A1 * | 7/2003 | Tsubata | 600/500 |
| 2008/0072404 A1 * | 3/2008 | Wetter | 24/68 R |
| 2009/0168612 A1 * | 7/2009 | Robin et al. | 368/282 |

FOREIGN PATENT DOCUMENTS

| | | |
|---|---|---|
| EP | 0 945229 | 9/1999 |
| GB | 1 176 946 | 1/1970 |
| GB | 1 400 484 | 7/1975 |
| JP | 55125431 A * | 9/1980 |
| JP | 63131038 | 6/1998 |
| WO | WO 9109726 A1 * | 7/1991 |
| WO | WO 95/20489 | 8/1995 |
| WO | WO 95/22444 | 8/1995 |
| WO | WO 00/44259 | 8/2000 |
| WO | WO 2005/016664 | 2/2005 |

\* cited by examiner

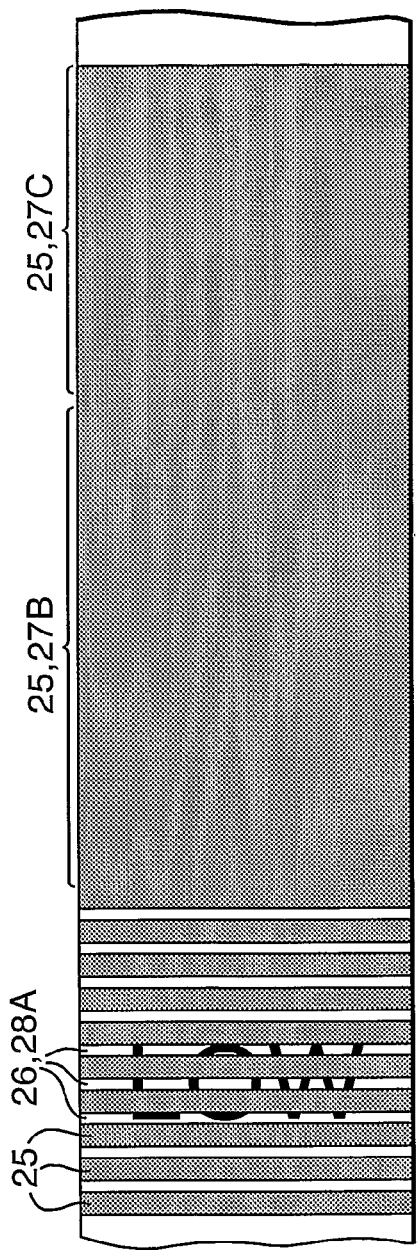
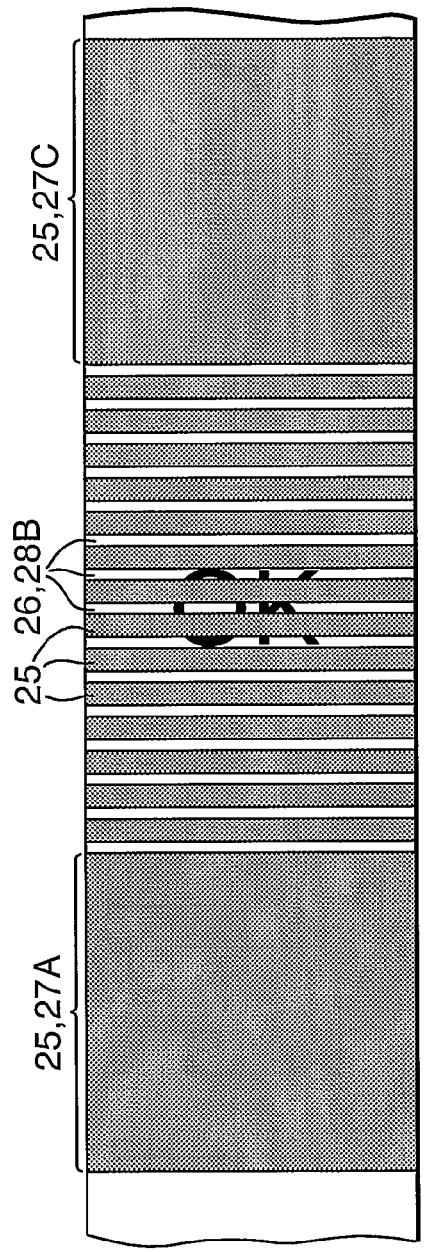
Fig. 16.
Fig. 17.

STRAIN-RESPONSIVE VISUAL INDICATOR

BACKGROUND OF THE INVENTION (1) Field of the Invention

The present invention relates to the general field of strain measurement or sensing.

(2) Description of the Art

Conventional strain gauges take a variety of forms and among the most common are resistance strain gauges which exploit the change in resistance of an electrically conductive material when the conductor is stretched or otherwise elastically deformed, and semiconductor strain gauges which exploit the change in the electronic charge across a piezoelectric crystal when the material is mechanically stressed. Such types obviously require the use of associated electronic monitoring equipment in order to give an indication of the measured strain. Purely mechanical strain gauges are also known but generally require precision mechanisms to amplify the small movements sensed and to convert them into an indication of strain. The present invention, on the other hand, seeks to provide a simple and inexpensive form of device capable of giving a visual indication of at least the general level of strain (or a related parameter) in an object to which it is applied, while avoiding the use of electronics and mechanical complexity.

One field of application for the invention with which the applicant is particularly concerned is a device for giving a simple indication of the level of flexural strain in the shaft of a toothbrush. In this respect it is well documented that brushing the teeth too hard can be detrimental to the condition of the teeth and gums. In general relatively low brushing pressure is sufficient to remove plaque from teeth. If teeth are brushed too hard the gums can start to recede causing bleeding of the gums and sensitive teeth. The surface of the teeth can also become damaged irreparably. In this field of application, therefore, an aim is to incorporate a simple visual indicator in a toothbrush which can be seen in a mirror while brushing and will signal if a predetermined strain in the shaft is generated, corresponding to a recommended limit of brushing pressure being exceeded or about to be exceeded.

There are also numerous other kinds of hand-held or hand-operated implement where it could be useful to provide a simple visual indication of strain in some part of the implement e.g. to signal the level of force being applied to a work piece or other object (including the human body) by or through the implement. Examples of such implements include razors, pens or other writing implements and hand tools such as screwdrivers, wrenches and saws etc.

This is, however, but one class of many possible applications for indicators according to the invention, others of which will appear from the ensuing description or will otherwise occur to those skilled in the art and include, without limitation, bridges, buildings and other civil engineering structures, railway tracks, ships' masts, sports rackets and balls, bolts, nuts, pipe couplings, vehicle tyres, fire extinguishers and other pressure vessels, load restraining straps, and other stressed articles.

SUMMARY OF THE INVENTION

In one aspect the invention resides in a strain-responsive visual indicator comprising a pair of overlapping members adapted to be mounted to a substrate such that strain in the substrate causes relative movement between those members; the proximal member (in the sense in which the indicator is viewed in use) comprising a set of windows alternating with separators arranged in the direction of said relative movement; the distal member comprising or being adapted to reveal indicia elements of at least two visually distinguishable types alternating in the direction of said relative movement; and said windows, separators and indicia elements being configured such that in a first relative position of said members a plurality of the windows of the proximal member register with indicia elements of a first said type and in a second relative position of said members said plurality of windows register with indicia elements of a second said type. The types of indicia elements may be visually distinguishable by being of different respective colours or may comprise other forms of markings.

DESCRIPTION OF FIGURES

These and other features of the invention, including potential uses thereof, will now be more particularly described, by way of example, with reference to the accompanying schematic drawings in which:

FIGS. 16, 17 and 18 are plan views of the components of FIG. 15 in their normal operative relationship and under three different strain conditions;

DESCRIPTION OF PREFERRED EMBODIMENTS

Figure 1:
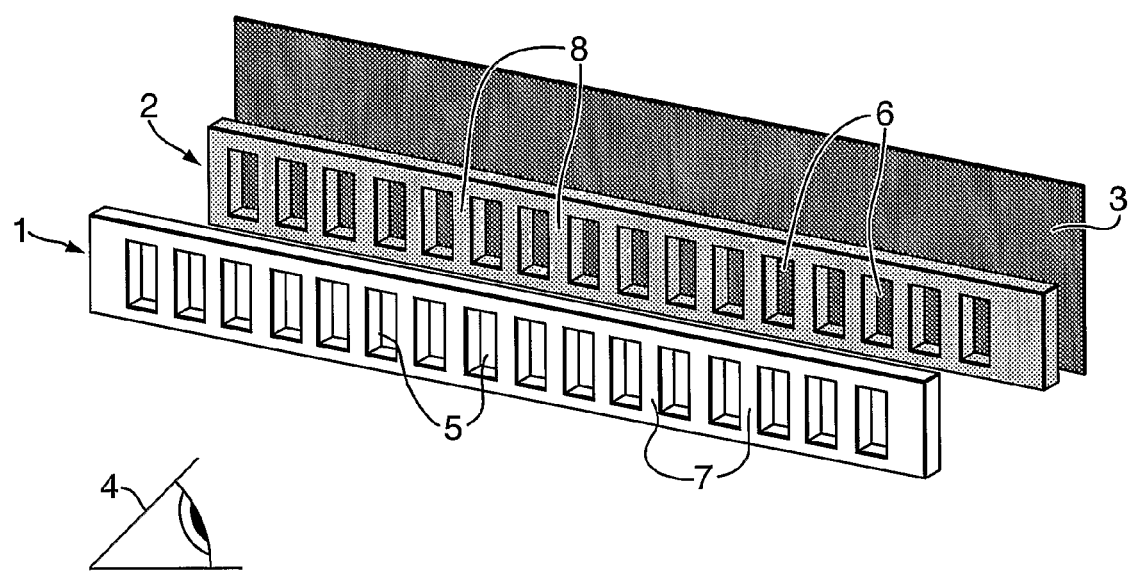
FIG. 1 illustrates the basic components of one form of strain-responsive visual indicator according to the invention.

Referring to FIG. 1, the basic components of the illustrated indicator comprise a pair of shutter strips 1 and 2 and a backing strip 3. The strips 1 and 2 are shown separated from each other for ease of illustration in this Figure but in the assembled indicator will lie closely one behind the other as viewed from the direction of the eye symbol 4. Each shutter strip 1 and 2 comprises a similar longitudinal series of equi-spaced windows 5, 6, in this embodiment shown as perforations through the thickness of the material of the strips, separated by bars of the respective strip material 7,8. The windows 5,6 and bars 7,8 in both strips 1 and 2 are all of substantially the same width (dimension in the longitudinal direction of the respective strip).

Figure 2A:
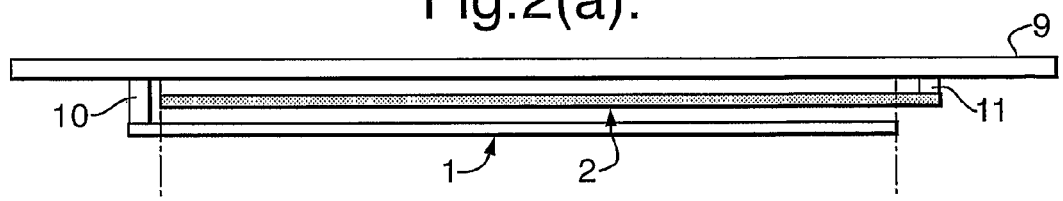
FIGS. 2(a), (b) and (c) are side views of the indicator of FIG. 1 as applied to a substrate, in different flexural conditions.
Figure 2B:
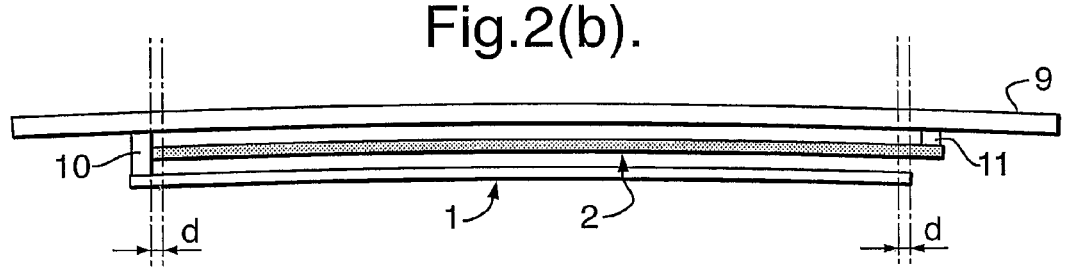
Figure 2C:
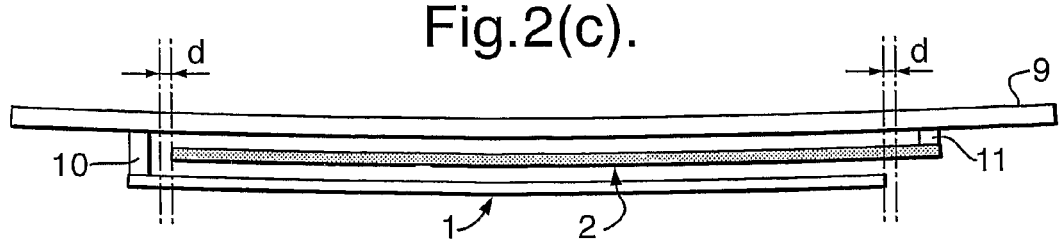

FIG. 2 illustrates the mounting of these strips to indicate strain in a substrate 9. Strips 1 and 2 are anchored to the substrate by respective fixtures 10 and 11 at opposite respective ends so that expected strain in the substrate causes relative movement between the strips in the longitudinal sense. For example strain caused by tensile stress in the longitudinal direction of the substrate 9 will cause the fixtures 10 and 11 to move relatively apart, so that the strips 1 and 2 will slide relatively to each other in the sense of the arrows M in FIG. 3(b). Flexural strain in the substrate which is convex with respect to the mounting of the strips 1 and 2 will likewise tend to slide them longitudinally apart as exemplified by FIG. 2(c), while flexural strain in the substrate which is concave with respect to the mounting of the strips 1 and 2 will tend to slide them longitudinally together as exemplified by FIG. 2(b).

Figure 3A:
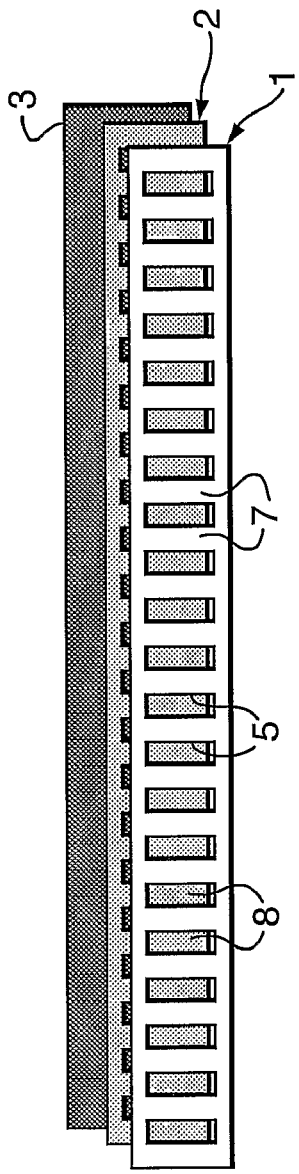
FIGS. 3(a) and (b) illustrate the principle of operation of the indicator of FIGS. 1 and 2.

FIG. 3(a) shows the disposition of the strips 1-3 from the direction as viewed in use with the substrate in an unstrained condition; (in FIG. 3 the strips are shown with some lateral relative displacement for ease of illustration, although in practice strip 1 will overly strips 2 and 3 to the whole of its height). In the FIG. 3(a) condition it will be seen that each window 5 in the proximal shutter strip 1 is in register with a bar 8 of the distal shutter strip 2 and no portion of the backing strip 3 will be viewed through the windows 5. If however the substrate 9 is strained so as to cause relative sliding of the strips 1 and 2 in, say, the direction of the arrows M in FIG. 3(b), it will be appreciated that the bars 8 of strip 2 will begin to be occluded by the bars 7 of the overlying strip 1 while the windows 5 of that strip begin to register with the windows 6 of the strip 2 so that portions of the backing strip 3 will become visible through the windows 5 and 6 until, when the strips 1 and 2 have slid relatively by a dimension equal to one window/bar width, the condition of FIG. 3(b) will be reached. In this condition the windows 5 of shutter strip 1 are fully in register with the windows 6 of shutter strip 2 and only portions of the backing strip 3 can be seen through these windows.

It will be appreciated that if strips 2 and 3 are of different colours, say green and red respectively, then this assembly can provide a simple indication of the level of strain in substrate 9. For example in the unstrained condition of FIG. 3(a) only the green of strip 2 will be visible through the windows 5; with increasing strain a combination of the green of strip 2 and the red of strip 3 will be visible, to varying relative extents, through the windows 5; and by appropriate selection of the dimensions of the windows and bars in strips 1 and 2 it can be arranged that at a selected level of strain in the substrate the condition of FIG. 3(b) is reached when only the red of strip 3 is visible through the windows 5.

Figure 3B:
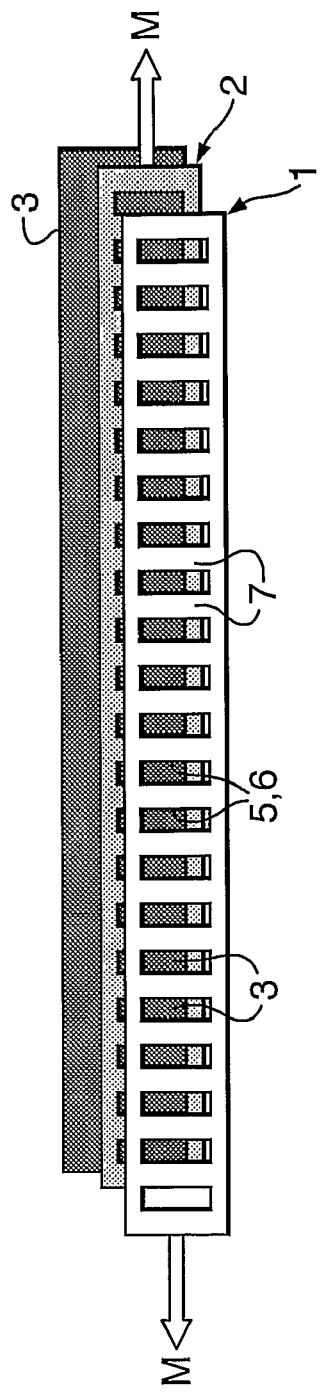

It will also be appreciated that a similar effect will occur if the strips 1 and 2 are caused to slide relatively to each other in the opposite sense to that indicated by the arrows M in FIG. 3(b), as would occur under compressive stress in the longitudinal direction of the substrate 9, or under concave flexure as exemplified in FIG. 2(b).

FIGS. 2(b) and 2(c) indicate, by way of example, the longitudinal displacement of each shutter strip 1 and 2 by a dimension d from the respective unstrained condition (in opposite senses) under concave and convex flexure of the substrate 9 respectively. In the condition when d is equal to one half of the width of a window 5 then this represents the condition in which the state of the indicator has changed from the fully "green" condition to the fully "red" condition.

The backing strip 3 is not shown separately in FIG. 2 but can be taken to be mounted to the rear of strip 2. In a functionally equivalent embodiment a separate backing strip can be omitted altogether and the distal shutter strip 2 can take the form of a continuous strip with alternating bars of different colours printed on it in place of the windows 6 and bars 8. Furthermore indicia of various kinds, including graphic symbols or text, could be used in place of the described colour coding for the indicator states as will be apparent to those skilled in the art.

Figure 4A:
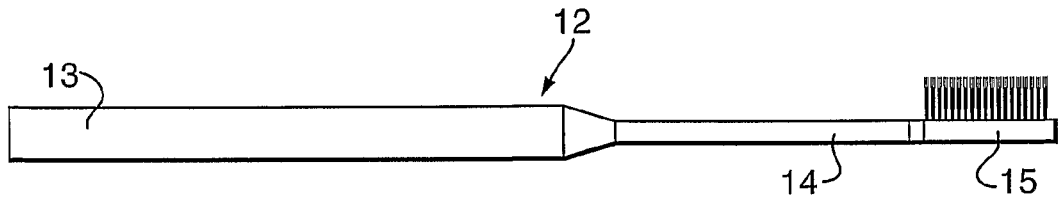
FIGS. 4(a) and (b) are respectively side and rear views of a toothbrush equipped with an indicator of the kind shown in FIGS. 1 to 3, in an unflexed condition.
Figure 4B:
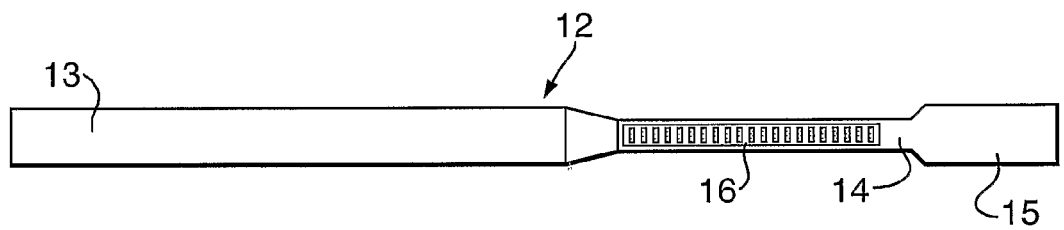
Figure 5A:
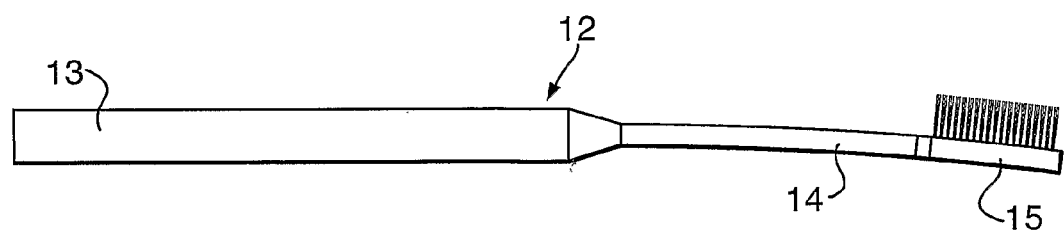
FIGS. 5(a) and (b) are respectively side and rear views of the toothbrush of FIG. 4, in a flexed condition.
Figure 5B:
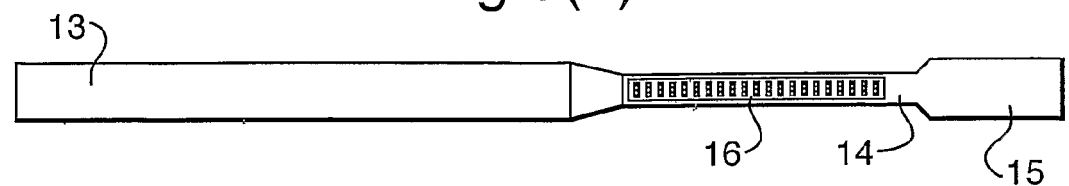

FIGS. 4 and 5 illustrate the application of an indicator of the kind described above in relation to FIGS. 1 to 3 to indicate flexural strain in the shaft of a toothbrush 12. The brush 12 is shown in an unstrained condition in FIG. 4 and comprises handle 13, shaft 14 and head 15 portions as conventional. As seen in FIG. 4(b) a strain indicator 16 according to the invention is mounted at the rear of the shaft 14, for example in a groove formed in the shaft and covered with a transparent viewing window or lens. More particularly the indicator 16 is assumed to comprise a pair of shutter strips extending longitudinally of the shaft 14 and attached to it in the manner of the strips 1 and 2 in FIG. 2(a). In the unstrained condition of FIG. 4 the windows in the proximal shutter strip are arranged to be fully in register with the bars (or windows) of the distal shutter strip so as to reveal a single colour, say green, similarly to the condition of the indicator shown in FIG. 3(a).

In use of the toothbrush 12 there will be a tendency for the shaft 14 to flex as the head 15 is pressed against the teeth, and this flexure will increase as the pressure of the head against the teeth is increased. FIG. 5 shows the shaft 14 flexing in this manner and it will be appreciated that this flexure is concave with respect to the mounting of the indicator 16, so that its two shutter strips will be caused to slide relatively to each other as exemplified by the condition of the indicator shown in FIG. 2(b). With sufficient flexure of the shaft 14 the shutter strips in indicator 16 will move to a condition in which the windows in the proximal strip are fully in register with the windows (or bars) of the distal strip so that the colour revealed has changed to, say, red, similarly to the condition of the indicator shown in 3(b). Having regard to the stiffness of the shaft 14, the dimensions of the windows and bars in the shutter strips can be so chosen that a fully "red" condition is reached if a recommended limit of brushing pressure is exceeded and the shaft 14 has been strained accordingly. If the user brushes his teeth in front of a mirror he will be able to see the state of the indicator 16 on the back of the shaft 14 in the mirror and use this to moderate his brushing technique to ensure that excessive pressure is not applied.

Figure 6A:
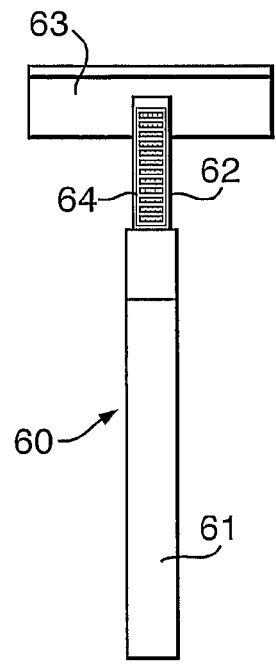
FIGS. 6(a) and (b) are respectively rear and side views of a razor equipped with an indicator of the kind shown in FIGS. 1 to 3, in an unflexed condition.
Figure 6B:
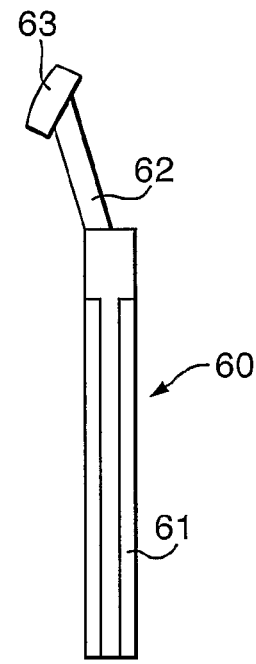
Figure 7A:
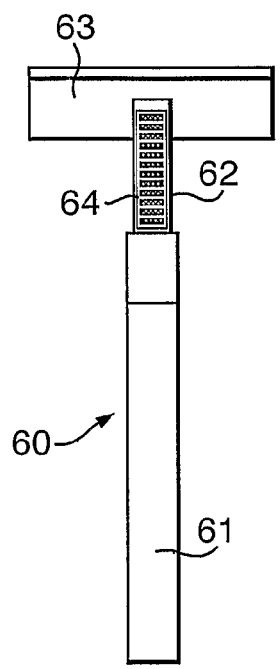
FIGS. 7(a) and (b) are respectively rear and side views of the razor of FIG. 6, in a flexed condition.
Figure 7B:
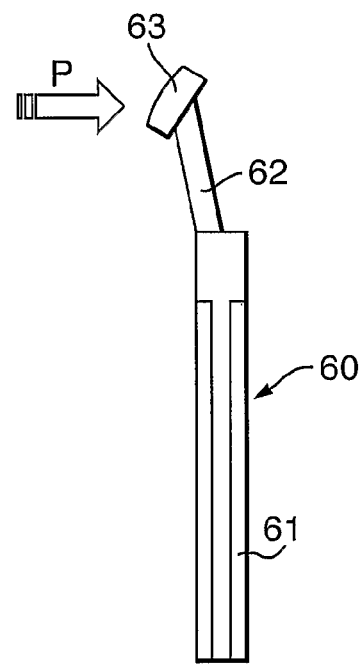

FIGS. 6 and 7 illustrate the application of an indicator of the kind described above in relation to FIGS. 1 to 3 to indicate flexural strain in the shaft of a wet-shaving safety razor 60. It is desirable to limit the pressure applied by a razor against the face (or other part of the body being shaved) in order to avoid damage to the skin, and, similarly to the above-described toothbrush, incorporating a visual strain indicator in the implement can assist the user in applying the correct pressure.

The razor 60 is shown in an unstrained condition in FIG. 6 and comprises a handle 61, shaft 62 and a head 63 in which a blade (not separately indicated) will be mounted, as conventional. As seen in FIG. 6(*a*) a strain indicator 64 according to the invention is mounted at the rear of the shaft 62, for example in a groove formed in the shaft and covered with a transparent viewing window or lens. More particularly the indicator 64 is assumed to comprise a pair of shutter strips extending longitudinally of the shaft 62 and attached to it in the manner of the strips 1 and 2 in FIG. 2(*a*). In the unstrained condition of FIG. 6 the windows in the proximal shutter strip are arranged to be fully in register with the bars (or windows) of the distal shutter strip so as to reveal a single colour, say green, similarly to the condition of the indicator shown in FIG. 3(*a*).

In use of the razor 60 there will be a tendency for the shaft 62 to flex as the head 63 is pressed against the skin, and this flexure will increase as the pressure of the head against the skin is increased. FIG. 7 shows the shaft 62 flexing in this manner (head 63 being pressed back in the direction of the arrow P with respect to the handle 61) and it will be appreciated that this flexure causes compression in the rear of the shaft where the indicator 64 is mounted, so that its two shutter strips will be caused to slide relatively to each other as exemplified by the condition of the indicator shown in FIG. 2(*b*). With sufficient flexure of the shaft 62 the shutter strips in indicator 64 will move to a condition in which the windows in the proximal strip are fully in register with the windows (or bars) of the distal strip so that the colour revealed has changed to, say, red, similarly to the condition of the indicator shown in 3(*b*). Having regard to the stiffness of the shaft 62, the dimensions of the windows and bars in the shutter strips can be so chosen that a fully "red" condition is reached if a recommended limit of shaving pressure is exceeded and the shaft 62 has been strained accordingly. If the user shaves his face in front of a mirror he will be able to see the state of the indicator 64 on the back of the shaft 62 in the mirror and use this to moderate his shaving technique to ensure that excessive pressure is not applied. If shaving another part of the body (e.g. the legs particularly in the case of a ladies' razor) the state of the indicator 64 can be viewed directly and similarly used to control the applied pressure.

Similar indicators to that described above may be used in numerous other applications.

For example the strain applied to a sailing ship's mast can vary greatly due to wind conditions and the number of sails being used, and there is a risk of masts breaking under high loads, particularly in the case of racing yachts where the structure is designed to be as light as possible and tolerances are small. If a visual strain indicator according to the invention is applied to the mast, the crew will be able to gain an understanding of the loads being experienced and modify the sail area or heading accordingly.

Again, the strings of a tennis or similar sports racket will stretch over time and through wear and this will affect their tension. String tension is important to the performance of the racket and of particular concern to the serious player. If a visual strain indicator according to the invention is applied to the frame of the racket the user will be able to interpret the state of tension in the strings which is reacted by the frame and know to replace them when the indicator shows that this has fallen below a certain level.

In another example a visual strain indicator according to the invention is applied to the external surface of a football, basketball or the like, the respective shutter members such as 1 and 2 and overlying viewing window or lens being sufficiently flexible to follow the curvature of the ball. By this means an indication of the state of inflation of the ball can be gained since this will directly affect the level of tensile strain in the envelope of the ball.

Figure 8:
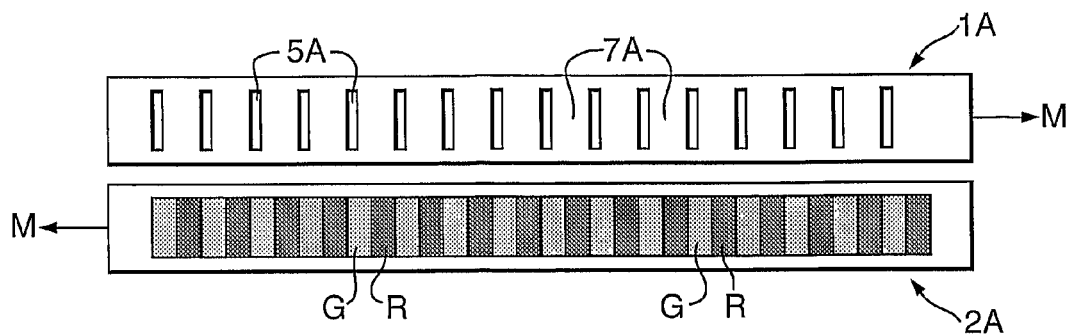
FIGS. 8, 9 and 10 are plan views of the shutter strips of three variants of an indicator according to the invention, shown laterally displaced for ease of illustration.

FIG. 8 illustrates a variant of the indicator described above. In this case there are two shutter strips 1A and 2A shown laterally displaced for ease of illustration but in practice strip 1A will overly strip 2A. Strip 2A is printed with a longitudinal series of equi-spaced bars of alternating colours, in this case green (G) and red (R). Strip 1A is formed (such as by printing on an acetate or other transparent sheet material) with a longitudinal series of equi-spaced windows 5A separated by opaque bars 7A. The windows and bars 5A, 7A are functionally similar to the windows and bars 5,7 of the strip 1 previously described but in this case the windows 5A are substantially narrower (in the longitudinal direction of the respective strip) than each of the coloured bars G,R of strip 2A, the widths of the bars 7A being correspondingly greater so that the combined width of each successive window and bar 5A,7A remains the same as the combined width of each successive pair of coloured bars G,R.

FIG. 8 shows the relative disposition of the strips 1A and 2A (laterally displaced) from the direction as viewed in use with the substrate to which the strips are attached in an unstrained condition. In this condition each window 5A in the proximal strip 1A will be in register with the left hand (as viewed) part of a respective green bar G of the distal strip 2A. If the substrate is strained so as to cause relative sliding of the strips 1A and 2A in the direction of the arrows M in the Figure each window 5A will effectively pass across the width of the underlying green bar G and, depending on the level of strain attained, may reach and pass across the width of the respective adjacent red bar R. The indication of the device as appearing in the windows 5A therefore changes from a "green" to a "red" condition similarly to the indicator previously described. By virtue of the relative dimensions of the windows 5A and bars G,R, however, the range of relative movement between the strips 1A and 2A during which both colours will be visible is reduced. Furthermore, for the same overall strip length and number of coloured bars this arrangement can accommodate a higher strain rate than the previously described embodiment. For example, if each window 5A is half the width of each bar G,R, then the full available range of relative movement between the strips 1A and 2A—from the condition in which the windows 5A register with the left hand (as viewed) parts of the green bars G to the condition in which the windows 5A register with the right hand (as viewed) parts of the red bars R—corresponds to one and a half times the width of a bar G,R. This compares to one half of the width of a bar when the windows and bars are of the same width in a two-colour system.

Figure 9:
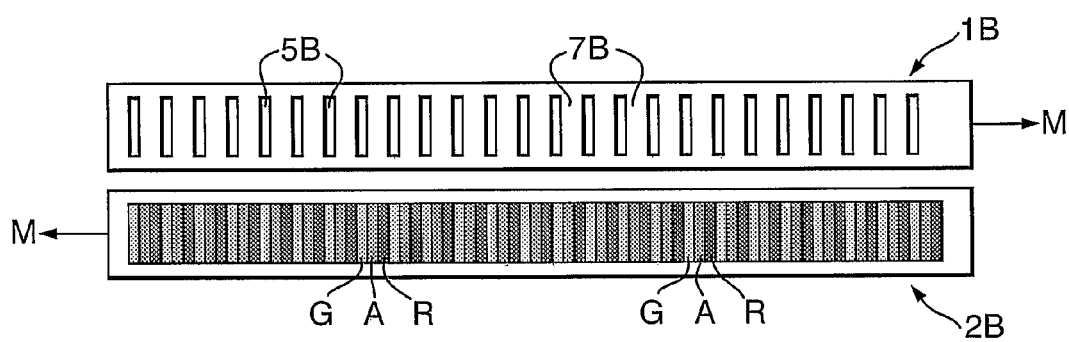

FIG. 9 illustrates another variant where in this case the distal strip 2B is printed with a longitudinal series of equi-spaced bars of three colours alternating in an ordered sequence of, say, green (G), amber (A) and red (R). The windows 5B in the proximal strip 1B are in this case of the same widths as each bar G,A,R and separated by wider opaque bars 7B so that the combined width of each successive window and bar 5B, 7B is the same as the combined width of each successive trio of coloured bars G,A,R. It will be appreciated that in this case the effect of relative sliding of the strips 1B and 2B in the direction of the arrows M under strain in the substrate to which they are attached will be to transition through successive indicating conditions, depending on the level of strain attained. That is to say in the unstrained condition in which the strips are shown (laterally displaced) in the Figure each window 5B will be in register with a respective green bar G, followed by an amber bar A as strain is increased and a red bar R under still higher strain, thereby providing progressive indications of the strain experienced. Clearly, further gradations of strain can be indicated by increasing the number of colours in each sequence of bars on the strip 2B and spacing the windows in strip 1B accordingly.

Figure 10:
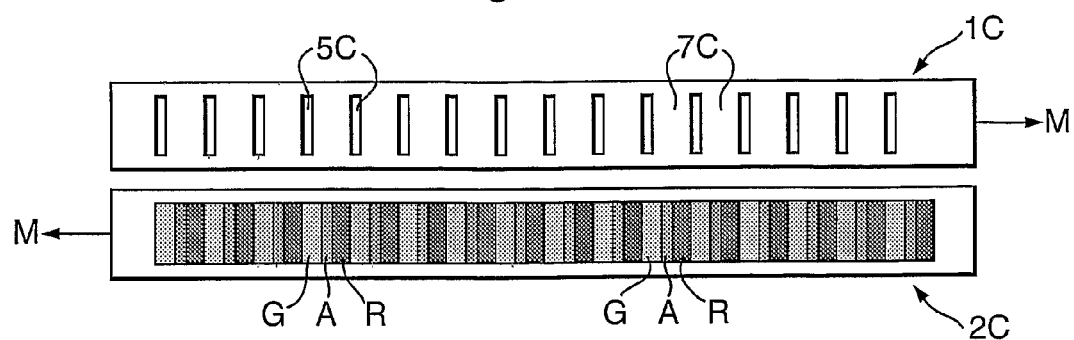

FIG. 10 illustrates a further variant which can be considered as a hybrid of the FIG. 8 and FIG. 9 embodiments. In this case the distal strip 2C is printed with a longitudinal series of bars of three colours alternating in an ordered sequence of, say, green (G), amber (A) and red (R), but where the green and red bars are wider than the amber bars. The windows 5C in the proximal strip 1C are the same widths as each amber bar A, (therefore narrower than the green and red bars G and R) and separated by wider opaque bars 7C so that the combined width of each successive windows and bar 5C, 7C is the same as the combined width of each successive trio of coloured bars G,A,R.

Figure 11:
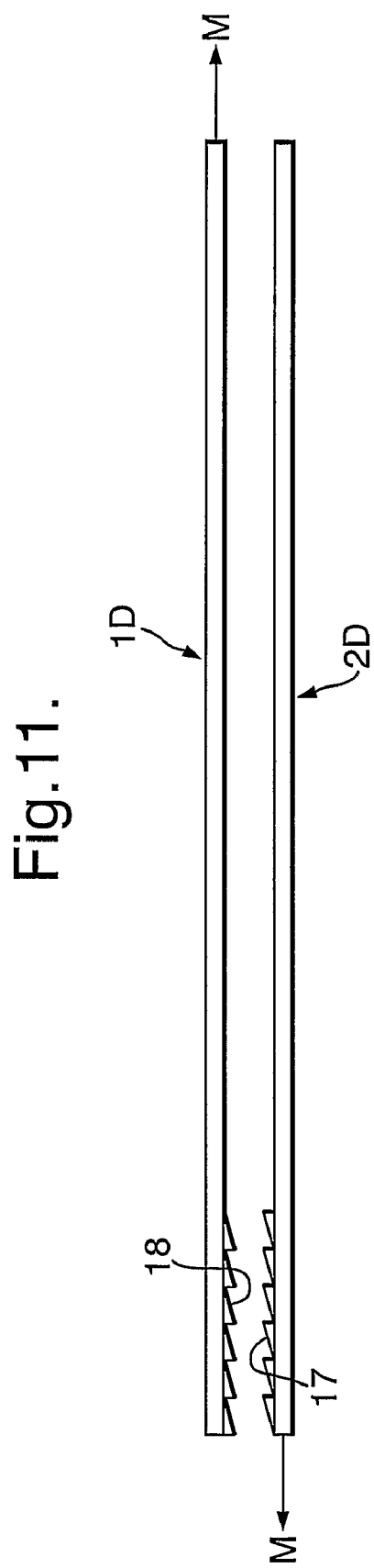
FIG. 11 is a side view of the shutter strips of another variant of an indicator according to the invention, shown separated for ease of illustration.

In yet another variant, means may be provided for retaining the two shutter strips in the position of maximum relative displacement attained over a given period of use, so as to record the maximum strain experienced during that period. For example FIG. 11 shows proximal and distal strips 1D and 2D in side view, and separated for ease of illustration, formed with respective serrations 17 and 18 in the nature of linear ratchet teeth on their confronting surfaces. In the normal operational disposition of the strips 1D, 2D with the serrations 17, 18 interengaged, it will be appreciated that they are configured to permit relative sliding of the strips in the direction of the arrows M under strain in the substrate to which they are attached, but not return movement if the strain subsides. The strips will therefore remain in the position corresponding to the maximum strain experienced during use. In this case a lost motion (one way) coupling will be required between either or both of the strips 1D, 2D and the substrate to accommodate relaxation of the substrate while the strips remain displaced, and the strips may themselves be reset to the starting position if and when required by separating them slightly to release the serrations 17, 18 from each other.

Although strain indicators according to the invention are designed to provide a visual indication of at least two states, that is to say distinguishable by the human eye, it is also possible for embodiments to be machine-readable. For example in the case where different strain conditions are indicated by different colours being displayed by the device, a chromatically-sensitive optical reader could be employed to monitor the device between or in place of visual inspections. Alternatively a device could be configured to reveal sections of a bar code printed on the distal shutter strip through the windows of the proximal shutter strip when a certain strain condition is reached, to be read by an associated scanner.

Figure 12:
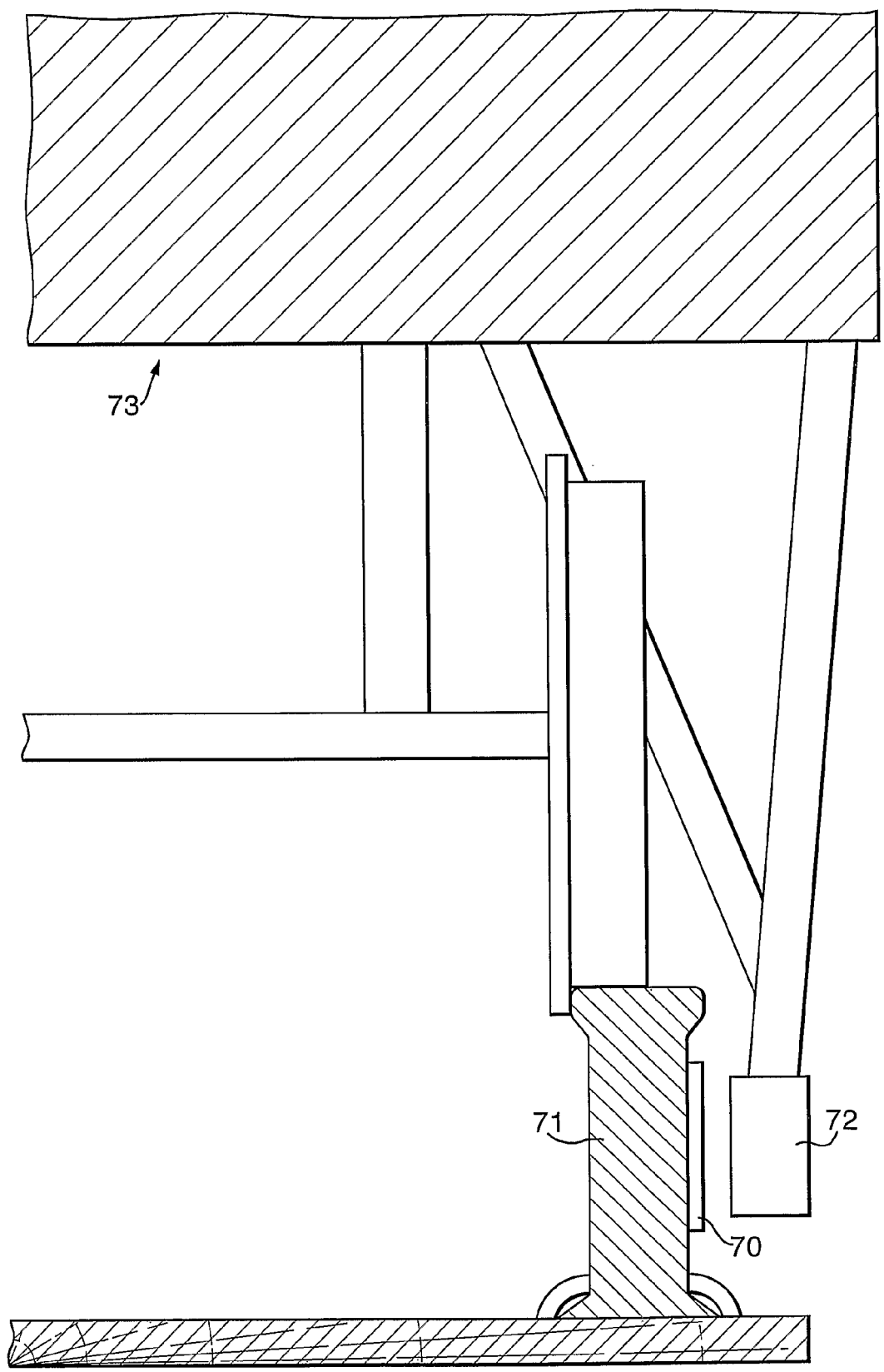
FIG. 12 is an end view of an machine-readable embodiment of an indicator according to the invention in use to monitor strain in a railway track and in the course of being read by an optical sensor on passing rolling stock.

One example where machine readable devices may be used is illustrated in FIG. 12, that is to say to indicate the level of strain in railway tracks. If indicators according to the invention are applied to the side surfaces of the rails at intervals along a railway line, such as illustrated in FIG. 12 by an indicator 70 applied to the rail 71 and oriented with the longitudinal direction of its shutter strips parallel to the longitudinal direction of the rail, they may be read by an optical sensor 72 mounted to rolling stock 73 so as to pass in proximity to such indicators when the rolling stock is hauled along the track. This may provide a useful aid to track inspection and assist in ensuring the safety of the rail network.

Figure 13:
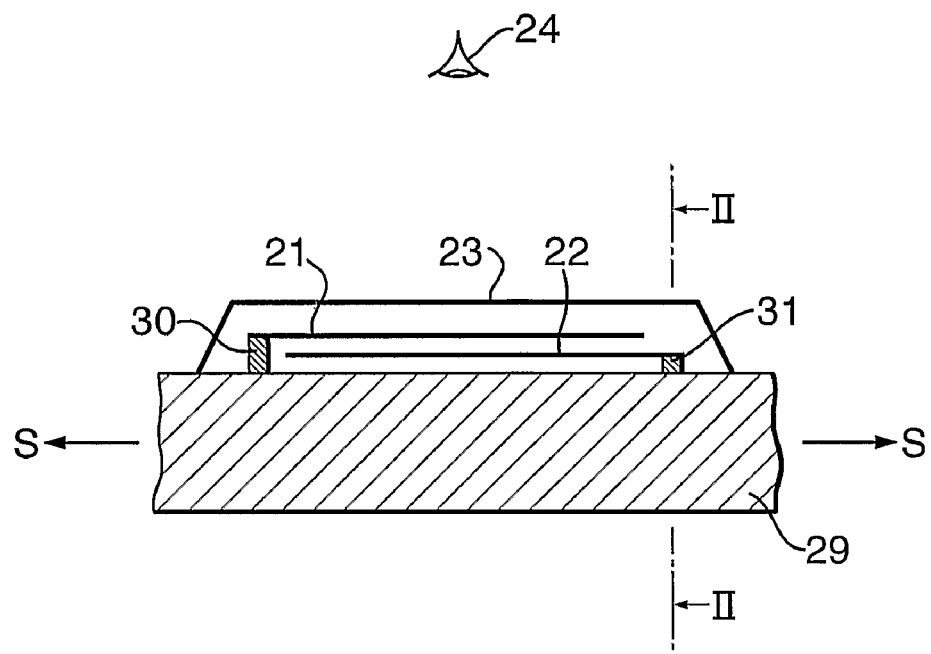
FIG. 13 is a longitudinal section through another embodiment of an indicator according to the invention, as applied to a substrate.
Figure 14:
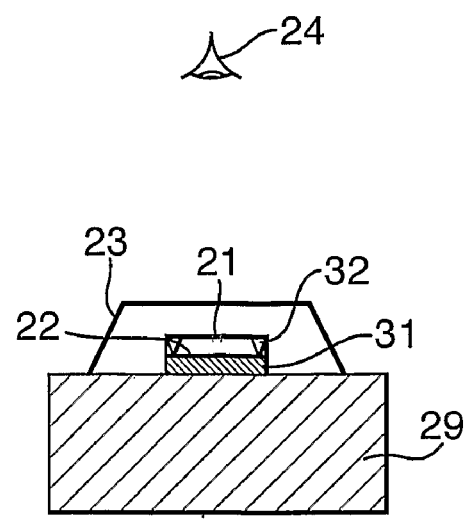
FIG. 14 is a section on the line II-II of FIG. 13.

Referring to FIGS. 13 and 14, the operative components of another indicator according to the invention comprise a pair of shutter strips 21 and 22 mounted one above the other in a protective housing 23. The housing 23, or at least its upper surface, is transparent so that the overlaid shutter strips can be viewed from the direction of the eye symbol 24, and may include a magnifying lens. The form of each shutter strip 21, 22 is illustrated in plan in FIG. 15, the strips being shown laterally displaced in this Figure for ease of illustration. The upper element 21 comprises a strip of transparent sheet material, e.g. acetate, upon which is printed a series of transverse opaque bars 25. The bars 25 are all of the same width and equi-spaced and divide the printed surface of the strip 21 into a series of windows 26. The lower element 22 is a similar strip upon which is printed a plurality, in this case three, of sets of transverse opaque bars 27A, 27B and 27C, dividing the printed surface of this strip into three corresponding sets of windows 28A, 28B and 28C. The bars 27A-27C are of the same widths and spacings in each set as the bars 5 in the upper strip, but the sets are spaced from each other so that the windows 28A-28C can interact with the windows 26 in the upper strip in the manner to be described hereafter. More particularly, the width of each bar 25 and 27A-27C (i.e. its dimension in the longitudinal direction of the respective strip) is twice that of each window 26 and 28A-28C. The set 27B is spaced from the set 27A by the dimension d equal to the width of one bar and the set 27C is spaced from the set 27B by the same dimension d. In practice the spaces between the sets 27A/27B and 27B/27C will be opaque but are shown clear in FIG. 15 for ease of illustration.

Figure 15:
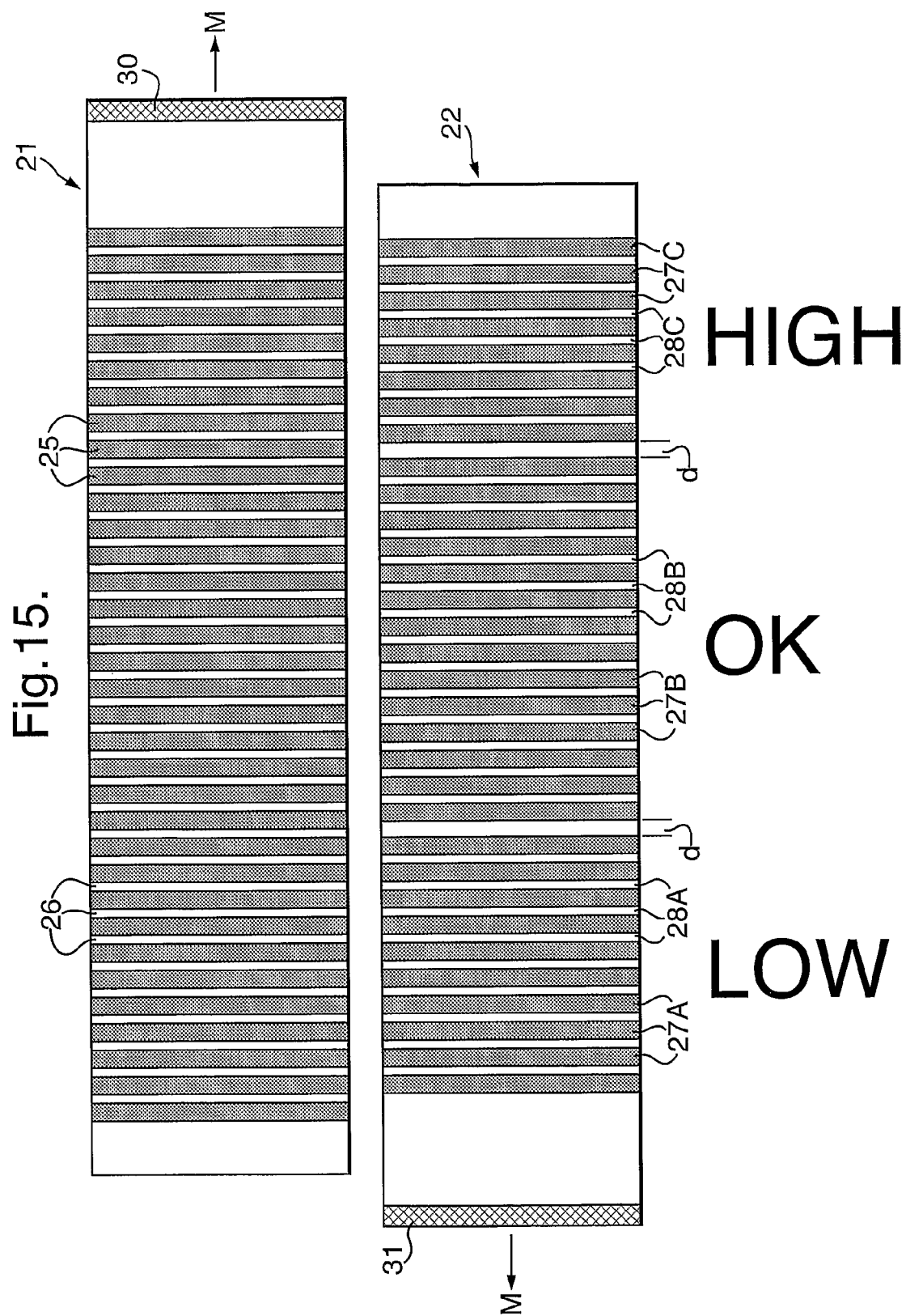
FIG. 15 is a plan view of the two shutter strips and associated indicia of FIGS. 13 and 14, shown laterally displaced from each other for ease of illustration.

Respective indicia are also associated with respective sets of windows 28A-28C, which in the illustrated embodiment comprise the words LOW, OK and HIGH, also shown laterally displaced in FIG. 15. In practice these indicia may be printed on a backing strip located beneath the shutter strips or directly onto the lower strip 22.

FIGS. 13 and 14 show the device as mounted on a substrate 29 so as to give an indication of strain in the substrate caused by applied tensile stress in the sense of the arrows S (FIG. 13). The shutter strips 21 and 22 are accordingly anchored to the substrate by fixtures 30 and 31 at opposite respective ends so that corresponding strain in the substrate causes relative movement between them in the sense of the arrows M in FIG. 15. The strips should be as close together as practicable to avoid parallax when viewed (their separation is exaggerated for clarity in FIGS. 13 and 14) but free to move with changes in strain. A film of lubricant and/or low-friction supports (notionally indicated at 32 in FIG. 14) may be provided between them.

Figure 18:
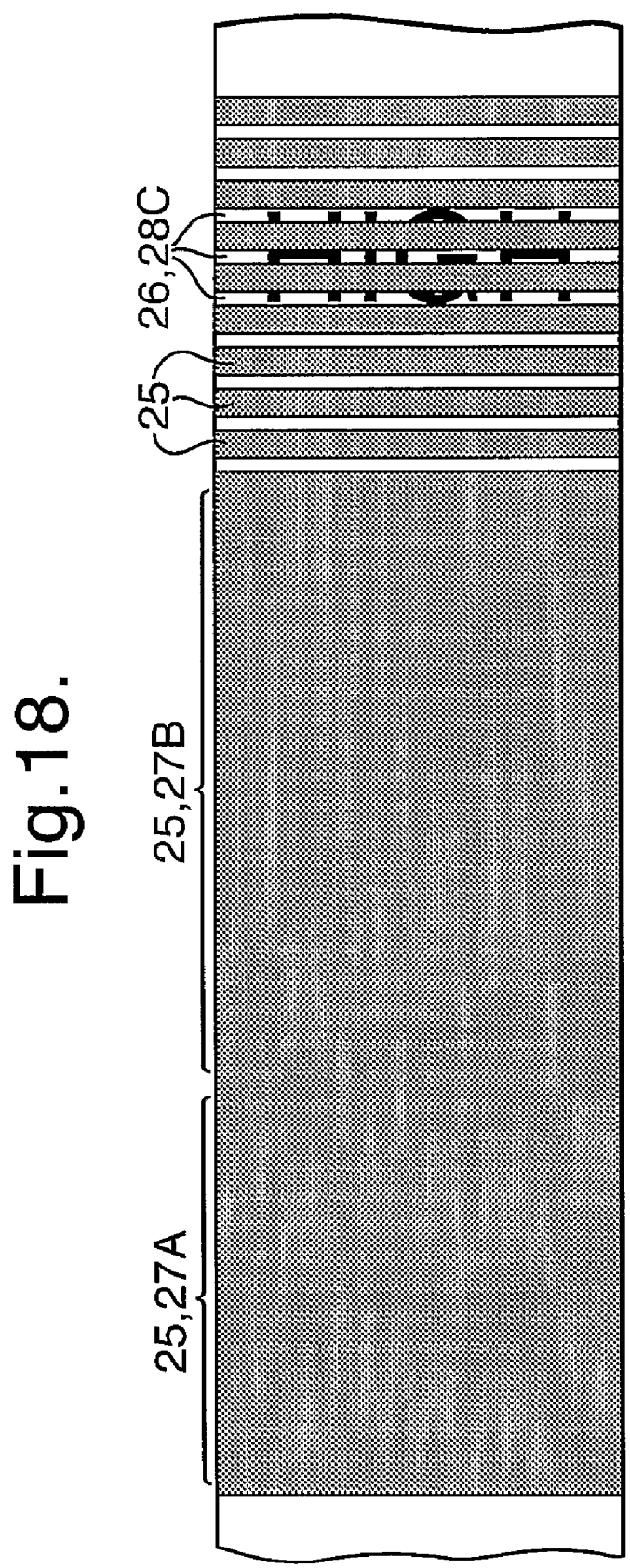

FIG. 15 shows (laterally displaced for clarity) the relative positions of the shutter strips 21 and 22 as applied to the substrate 29 when there is little or no applied stress. It will be appreciated that in this condition the set of windows 28A in the lower strip 22 are in register with windows 26 in the overlying strip 21, while the other two sets of windows 28B and 28C in the lower strip are covered by bars 25. More particularly, the windows 28B are covered by the trailing halves of the corresponding bars 25 (in the sense of the direction of movement of strip 21) and the windows 28C are covered by the leading halves of the corresponding bars 25. In this condition, therefore, only the indicia associated with windows 28A can be seen through the upper strip 21 from the viewpoint 24, as depicted in FIG. 16. As strain in the substrate 29 increases, relative movement occurs between the shutter strips in the sense of the arrows M in FIG. 15, i.e. so that the strip 21 moves to the right with respect to the strip 22 as viewed in that Figure. The effect of this movement is that the set of windows 28A in the lower strip begin to be occluded by bars 25 in the overlying strip 21 while windows 26 in that strip begin to register with the set of windows 28B in the lower strip. The indicia associated with both window sets 28A and 28B are therefore visible to varying degrees until the strips 21 and 22 have moved relatively from the FIG. 15 condition by a dimension equal to one window width. In this condition the windows 28A have become fully occluded by bars 25 while the windows 28B are fully in register with windows 26. The windows 28C remain covered by bars 25 throughout this degree of movement, however, owing to the fact that the bars are twice the width of the windows and to the relative spacing of the window sets 28A-28C. In this condition, therefore, only the indicia associated with windows 28B can be seen through the upper strip 21 from the viewpoint 24, as depicted in FIG. 17, the indicia in this embodiment being chosen to indicate that this is an acceptable degree of strain. If the substrate becomes further strained from this condition further relative movement will occur between the shutter strips 21 and 22 and, by analogy with the foregoing description, it will be appreciated that when they have moved relatively by a further dimension equal to one window width (or a total dimension from the FIG. 15 condition equal to one bar width) a condition will be reached where the windows 28C have become fully in register with windows 26, the windows 28B have become fully occluded by bars 25, and the windows 28A remain covered by bars 25, so that only the indicia associated with windows 8C can be seen through the upper strip from the viewpoint 24, as depicted in FIG. 18, thus indicating a high strain condition.

This embodiment of the invention can therefore be used to give a visual indication of three different strain levels in a substrate to which it is applied, and gradations between. By way of example, if the nominal distance between the fixtures 30 and 31 is 100 mm and the width of each window is 1 micron the device will change from one indicating condition to the next after an increment of 10 microstrain; (microstrain= (change in length÷original length)×$10^6$). The indicia selected for this purpose are open to variation and instead of the illustrated LOW, OK and HIGH may comprise e.g. numerals or simply different coloured fields within the window sets 28A, 28B and 28C. By increasing the width ratio of bars to windows the number of discrete window sets and corresponding indicia can be increased, although at the expense of the size of visible indicating area in each case. Likewise, a two-field indicator can be produced where the bars and windows are of equal width. More generally it can be stated that the relationship between the number of available indicating fields (n) and the widths of the bars (b) and windows (s) is given by n=(b÷w)+1.

Devices of the kind described above can be used in numerous applications where it is desired to provide a simple visual indication of the strain (or a related parameter) in an object, for example for checking loads in bridges or other civil engineering structures, the torque in bolts, nuts or pipe couplings, the pressure in tyres, fire extinguishers or other pressure vessels, or the tension in slings and ropes, and many more will occur to those skilled in the art.

Figure 19:
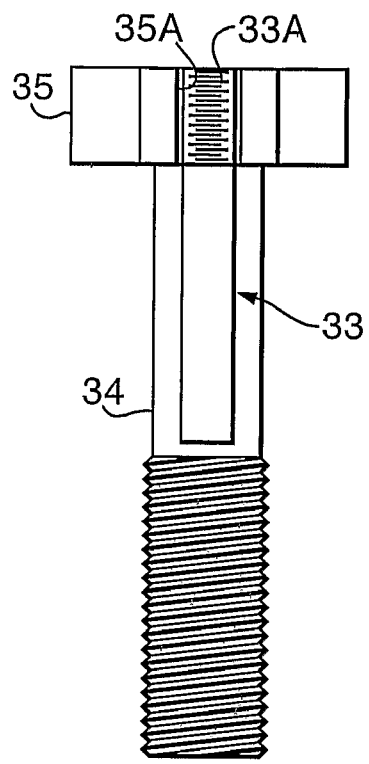
FIGS. 19 and 20 are elevation and plan views of a bolt to which an indicator according to the invention is applied.
Figure 20:
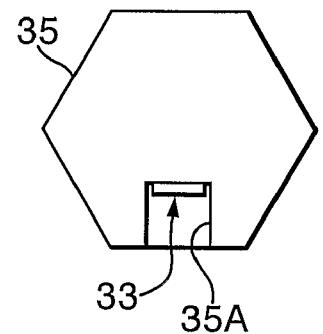
Figure 21:
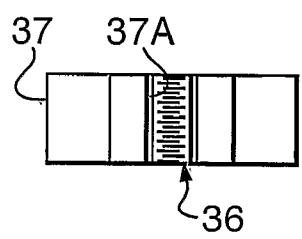
FIGS. 21 and 22 are elevation and plan views of a nut to which an indicator according to the invention is applied.
Figure 22:
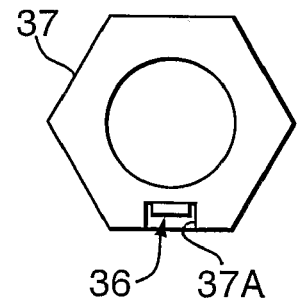

By way of example, FIGS. 19 to 22 show possible applications of indicators according to the invention to bolts and nuts. In FIGS. 19 and 20 an indicator 33 is applied to the shank 34 of a bolt and has a viewing window 33A visible through a slot 35A cut in the bolt head 35. In FIGS. 21 and 22 an indicator 36 is mounted in a slot 37A cut in a nut 37 (or could be mounted directly to one of its flats). In each case the indicator 33 or 36 gives an indication of the axial strain in the bolt or nut when tightened, which is dependent on the applied torque. FIG. 19 also indicates an example of an indicator 33 where the shutter strips are extended in length to capture greater relative movement between their anchor points but the windows and indicia corresponding to FIG. 15 are located at one end (which is the only visible portion in use of the bolt).

Figure 23:
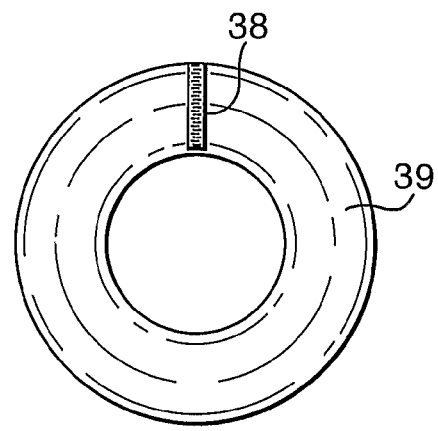
FIG. 23 is a side view of a vehicle tyre to which an indicator according to the invention is applied.

FIG. 23 shows an indicator 38 according to the invention applied to the sidewall of a vehicle tyre 39. This could be used to indicate whether the tyre is correctly inflated, since the strain in the sidewall will depend on the pressure in the tyre. Similarly, an indicator of this kind could be applied to detect the circumferential strain in a fire extinguisher body, aerosol can or the like, thereby to indicate if it is full/correctly pressurised. The combination of an expansible/compressible fluid-filled enclosure and an indicator according to the invention responsive to the strain in the enclosure could also be used more generally as a temperature or pressure (e.g. depth or altitude) indicator.

Returning to FIGS. 15 to 18 it will be appreciated that if the substrate was strained beyond the HIGH condition further relative movement between the shutter strips 21 and 22 would cause the window set 28A to again register with windows 26 so that the LOW indicia would become visible. In applications where large strain ranges are encountered a given shutter combination might then cycle through all its indicating conditions a number of times. In such circumstances it is envisaged that an indicator with multiple pairs of shutter strips of coarser and finer pitch in parallel could be used. For example there could be a fine shutter pair with four indicating fields which cycles through all indicia every 10 microstrain, a coarser shutter pair (i.e. where the bars and windows are of greater respective widths and fewer in number) with four indicating fields which cycles through all indicia every 40 microstrain, and a still coarser shutter pair with four indicating fields which cycles through all indicia in 160 microstrain. By reading from all three pairs at any given time a combination device of this kind could therefore be used to indicate microstrain within a range of 0-160 to an accuracy of 2.5.

It will also be appreciated that practical utilisation of an indicator as illustrated in FIGS. 13 to 15 depends on the relative positions of the two shutter strips 21, 22 being accurately set at the time of attaching them to the substrate. The device may therefore include a holder (not shown) which maintains the strips in a fixed relationship from the time of manufacture and prevents relative movement between them up to the time of usage and which is removed when the fixtures 30 and 31 have been anchored to the substrate.

In an alternative embodiment the bars 25 on the upper shutter strip 21, instead of being printed perpendicular to the longitudinal direction of the strip as illustrated in FIG. 15, are printed at a slight angle so that the two ends of each bar are relatively displaced in the longitudinal direction by a dimension at least equal to one bar width. It follows that the device will reveal different indicia at different longitudinal "slices" across the width of the overlaid shutter strips. By replacing the viewing window with a movable slit so that only one "slice" can be seen at a time an initial indication can be selected by selecting and then fixing the position of the slit when the fixtures 30 and 31 have been anchored to the substrate. This effectively calibrates the indicator in situ and overcomes the need to have the two shutter strips in specified relative positions at the outset.

Figure 24:
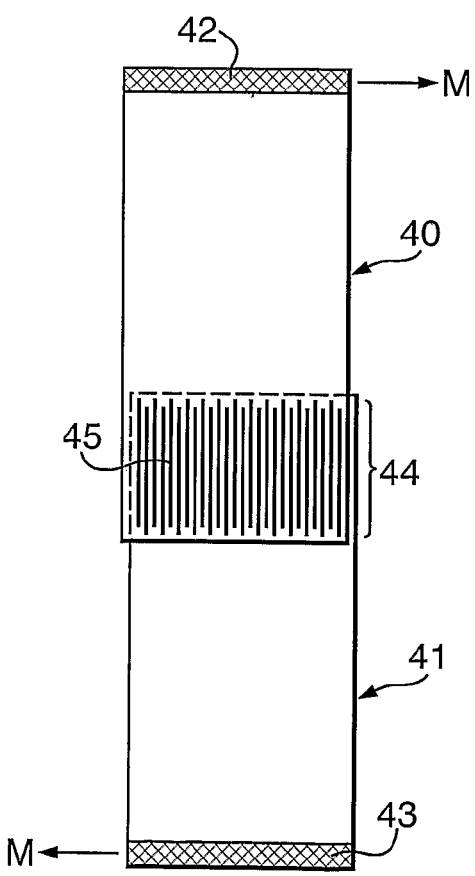
FIG. 24 illustrates the principle of operation of another embodiment of an indicator according to the invention.

FIG. 24 illustrates the principle of operation of another embodiment of an indicator according to the invention which is more particularly intended for the indication of torsional strain. In this case there are two shutter strips 40 and 41 adapted to be anchored to a substrate by fixtures 42 and 43 at opposite respective ends. The strips 40, 41 have a central area of overlap generally indicated at 44. In this area the nearer (as viewed) strip 40 is printed with a series of bars notionally indicated at 45 and similar to the bars 26 in FIG. 12, although in this case they are aligned in parallel with the longitudinal axis of the strip. Also in this area the second strip 41 is printed with sets of bars and associated indicia similar to those of the strip 22 in FIG. 12 and again aligned in this case in parallel with the longitudinal axis of the strip. If the strips 40 and 41 are caused to move laterally relative to each other, i.e. in the sense of the arrows M in FIG. 21, then their overlapping printed portions will interact in the same manner as described above with reference to FIGS. 15 to 18 to give various indications.

Figure 25:
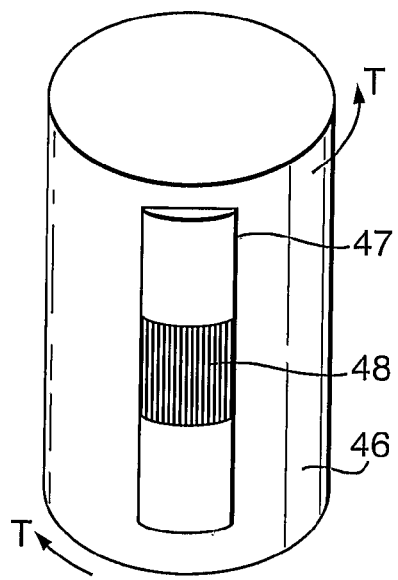
FIG. 25 illustrates an indicator in accordance with FIG. 24 as applied to a structural member.

FIG. 25 illustrates the use of an indicator in accordance with the principle of FIG. 24 to give an indication of strain in a structural member 46 caused by torque applied in the sense of arrows T. It comprises a housing 47 with a viewing window 48 through which the overlapping area 44 of the strips 40, 41 can be viewed. The strips are anchored to the structure 46 within the housing such that relative movement takes place between them as described with reference to FIG. 24 as the structure strains under the applied torque.

Figure 26:
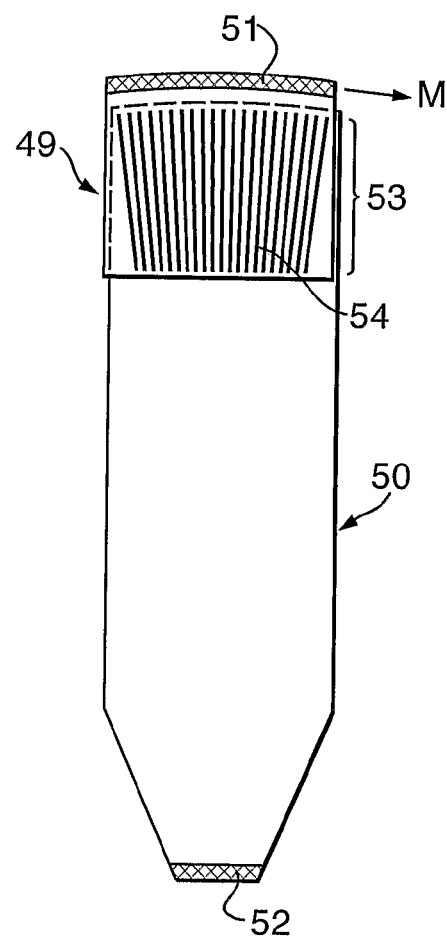
FIG. 26 illustrates the principle of operation of a further embodiment of an indicator according to the invention.

FIG. 26 illustrates the principle of operation of a further embodiment of an indicator according to the invention which is more particularly intended for the indication of torsional strain. In this case there are two shutter strips 49 and 50 adapted to be anchored to a substrate by fixtures 51 and 52 at opposite respective ends. The strips 49, have an area of overlap generally indicated at 53. In this area the nearer (as viewed) strip 49 is printed with a series of bars notionally indicated at 54 and functionally similar to the bars 26 in FIG. 15, although in this case they are directed radially with respect to the fixture 52. Also in this area the second strip 50 is printed with sets of bars and associated indicia functionally similar to those of the strip 22 in FIG. 15 and again directed radially with respect to the fixture 52. If the strip 49 is caused to move circumferentially relative to the strip 50, i.e. in the sense of the arrow M in FIG. 23, then their overlapping printed portions will interact in a similar manner to those described above with reference to FIGS. 15 to 18 to give various indications.

Figure 27:
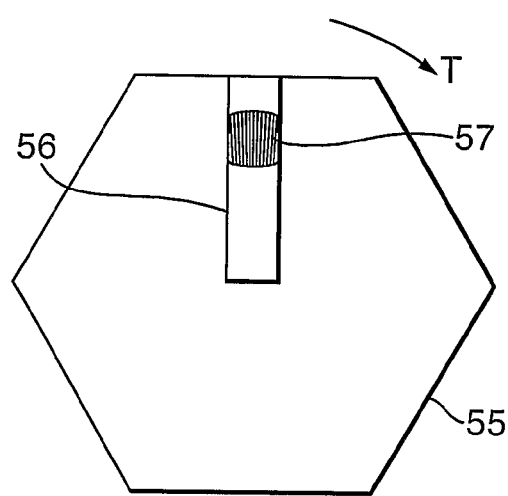
FIG. 27 illustrates an indicator in accordance with FIG. 26 as applied to a bolt head.

FIG. 27 illustrates the use of an indicator in accordance with the principle of FIG. 26 to give an indication of strain in a bolt head 55 caused by tightening torque in the sense of arrow T. It comprises a housing 56 with a viewing window 57 through which the overlapping area 53 of the strips 50, 51 can be viewed. Strip 50 is anchored to the bolt head at or near its geometric centre by the fixture 52 and strip 49 is anchored to the bolt head towards its periphery by the fixture 51 such that strip 29 is caused to move relative to strip 50 as described with reference to FIG. 26 as the bolt head strains under the applied torque.

The invention claimed is:

1. A strain-responsive visual indicator comprising a pair of overlapping members adapted to be mounted to a substrate such that strain in the substrate causes relative movement between those members; the proximal member comprising a set of windows alternating with separators arranged in the direction of said relative movement; the distal member comprising or being adapted to reveal indicia elements of at least three visually distinguishable types alternating in ordered sequence in the direction of said relative movement; and said windows, separators and indicia elements being configured such that in a first relative position of said members a plurality of the windows of the proximal member register with indicia elements of a first said type, in a second relative position of said members said plurality of windows register with indicia elements of a second said type, and in a third relative position of said members said plurality of windows register with indicia elements of a third said type; and wherein said windows are not substantially wider and said separators are substantially wider than each said indicia element in said direction of relative movement, and the combined width of each successive window and separator is substantially equal to the combined width of each succession of different indicia elements in said direction of relative movement.

2. An indicator according to claim 1 wherein said types of indicia elements are of different respective colours.

3. An indicator according to claim 1 wherein said windows are substantially narrower than at least some said indicia elements in said direction of relative movement.

4. An indicator according to claim 1 wherein said members are adapted to be mounted for substantially rectilinear relative movement between them.

5. An indicator according to claim 1 wherein said members are adapted to be mounted for substantially arcuate relative movement between them.

6. An indicator according to claim 1 wherein said members are adapted to flex with flexure of a substrate.

7. A length of railroad rail equipped with a strain-responsive visual indicator according to claim 1.

8. A strain-responsive visual indicator comprising a pair of overlapping members adapted to be mounted to a substrate such that strain in the substrate causes relative movement between those members; the proximal member comprising a series of windows alternating with separators arranged in the direction of said relative movement; the distal member comprising or being adapted to reveal a plurality of sets of indicia elements each of at least two visually distinguishable types alternating in said direction of relative movement, each of which sets is adapted to register with a respective portion of the series of windows and separators in the proximal member; and said windows, separators and indicia elements being configured such that, for each said set of indicia elements, in a respective first relative position of said members a respective plurality of the windows of the proximal member register with indicia elements of a first said type in the respective set and in a respective second relative position of said members the respective plurality of windows register with indicia elements of a second said type in the respective set, and such that said sets provide respective indications in turn with increasing relative movement between said members.

9. An indicator according to claim 8 wherein the indicia elements of one of said types in each said set collectively represent a respective word or numeral.

10. An indicator according to claim 8 wherein the indicia elements of one of said types in each said set collectively represent a respective bar code.

11. An indicator according to claim 8 wherein the number (n) of said sets of indicia elements in or revealed by the distal member is related to the dimensions in the direction of relative movement of the windows (w) and separators (b) in the proximal member by the expression n =(b ÷w) +1.

12. A length of railroad rail equipped with a strain-responsive visual indicator according to claim 8.

13. A strain-responsive visual indicator comprising a pair of overlapping members adapted to be mounted to a substrate such that strain in the substrate causes relative movement between those members; the proximal member comprising a set of windows alternating with separators arranged in the direction of said relative movement; the distal member comprising or being adapted to reveal indicia elements of at least two visually distinguishable types alternating in the direction of said relative movement; and said windows, separators and indicia elements being configured such that in a first relative position of said members a plurality of the windows of the proximal member register with indicia elements of a first said type and in a second relative position of said members said plurality of windows register with indicia elements of a second said type; and wherein said windows and indicia elements are inclined relative to each other in said direction of relative movement and means are provided for restricting the view of said members to a selectable transverse portion thereof.

14. A strain-responsive visual indicator comprising a plurality of pairs of overlapping members adapted to be mounted to a substrate such that strain in the substrate causes relative movement between each said pair; the proximal member of each said pair comprising a set of windows alternating with separators arranged in the direction of said relative movement; the distal member of each said pair comprising or being adapted to reveal indicia elements of at least two visually distinguishable types alternating in the direction of said relative movement; and said windows, separators and indicia elements of each said pair being configured such that in a first relative position of the respective pair a plurality of the windows of the respective proximal member register with indicia elements of a respective first said type and in a second relative position of the respective pair said plurality of windows register with indicia elements of a respective second said type; and wherein the windows and indicia elements of the respective said pairs are of different respective pitch.

15. A length of railroad rail equipped with a strain-responsive visual indicator according to claim 14.

16. A strain-responsive visual indicator comprising a pair of overlapping members adapted to be mounted to a substrate such that strain in the substrate causes relative movement between those members; the proximal member comprising a set of windows alternating with separators arranged in the direction of said relative movement; the distal member comprising or being adapted to reveal indicia elements of at least two visually distinguishable types alternating in the direction of said relative movement; and said windows, separators and indicia elements being configured such that in a first relative position of said members a plurality of the windows of the proximal member register with indicia elements of a first said type and in a second relative position of said members said plurality of windows register with indicia elements of a second said type; and further comprising means for retaining said members in the position of maximum relative displacement attained over a period of use.

17. A toothbrush or razor equipped with a strain-responsive visual indicator comprising a pair of overlapping members adapted to be mounted to a substrate such that strain in the substrate causes relative movement between those members; the proximal member comprising a set of windows alternating with separators arranged in the direction of said relative movement; the distal member comprising or being adapted to reveal indicia elements of at least two visually distinguishable types alternating in the direction of said relative movement; and said windows, separators and indicia elements being configured such that in a first relative position of said members a plurality of the windows of the proximal member register with indicia elements of a first said type and in a second relative position of said members said plurality of windows register with indicia elements of a second said type.

18. A toothbrush or razor according to claim 17 comprising at least a shaft portion and a head portion, said indicator being attached to indicate flexural strain in said shaft portion.

19. A toothbrush or razor according to claim 18 wherein said indicator extends along the rear of said shaft portion to be visible in a mirror facing the user in normal use of the implement.

* * * * *